Sept. 19, 1933.  R. W. JOHNSON  1,927,036
SAFETY RELIEF VALVE FOR HOT WATER HEATING SYSTEMS
Filed Jan. 10, 1930  2 Sheets-Sheet 1
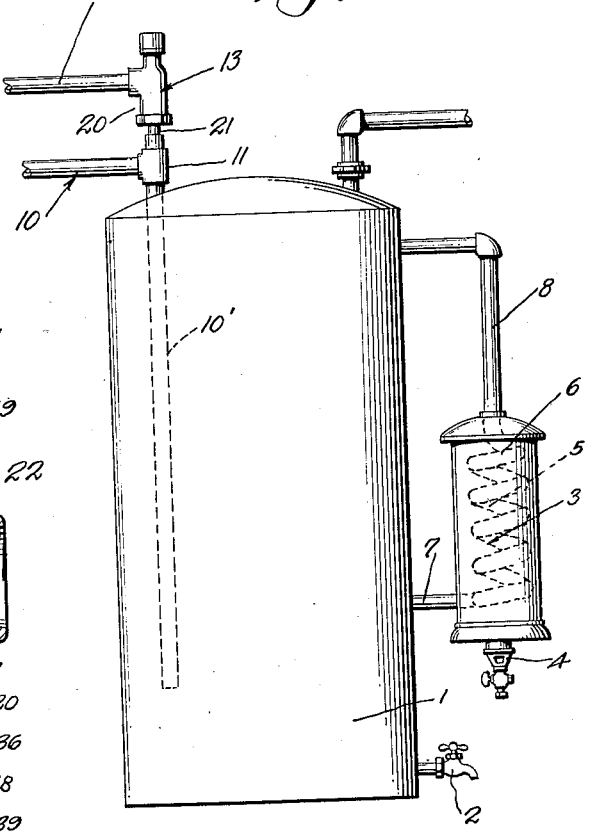
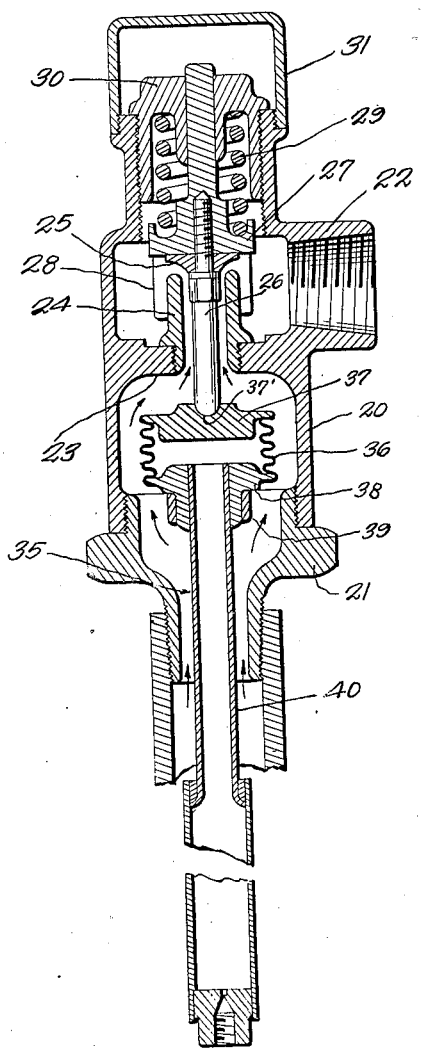
Inventor
Roy W. Johnson Sept. 19, 1933.  R. W. JOHNSON  1,927,036
SAFETY RELIEF VALVE FOR HOT WATER HEATING SYSTEMS
Filed Jan. 10, 1930  2 Sheets-Sheet 2
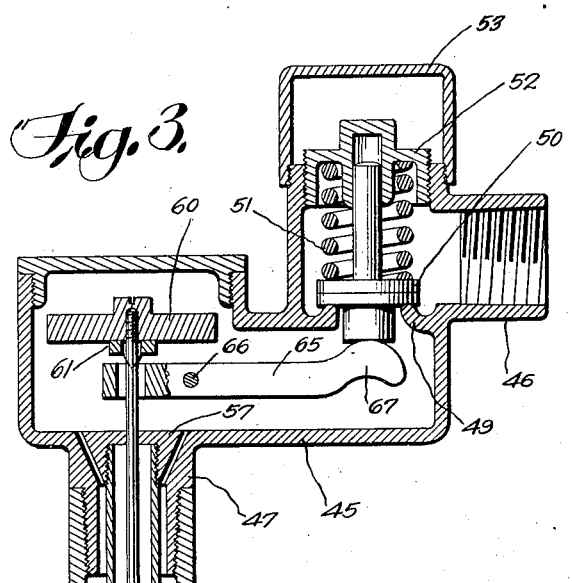
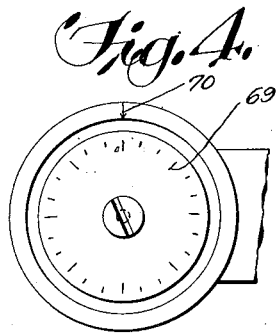
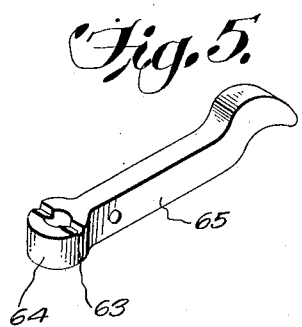
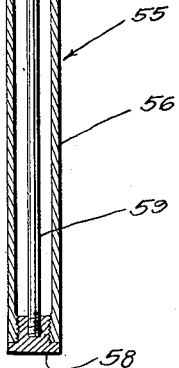
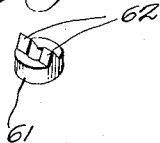
Inventor
Roy W. Johnson
By
Attorneys Patented Sept. 19, 1933

1,927,036

UNITED STATES PATENT OFFICE 1,927,036

SAFETY RELIEF VALVE FOR HOT WATER HEATING SYSTEMS

Roy W. Johnson, Elkhart, Ind., assignor, by mesne assignments, to Minneapolis-Honeywell Regulator Company, Minneapolis, Minn., a corporation of Delaware Application January 10, 1930. Serial No. 419,794

3 Claims. (Cl. 137—139)

This invention relates in general to hot water heating systems, and more particularly to a novel organization of a safety relief valve with such a system.

Heretofore, various types of safety relief valves have been proposed for use with hot water heating systems. These valves have always been incorporated in the pipe line which conducts the hot water from the heater into the storage tank of the system, the safety relief valve being interposed between the hot water pipe and an off-take pipe or drain connection. Under normal conditions, the valve is held closed by a spring, but should the pressure in the tank increase to a dangerous degree, the valve is automatically opened, and the hot water flows out through the off-take pipe, until the pressure is reduced to a safe point. It is also common to organize with such a relief valve, a thermostat subject to the temperature in the hot water pipe, the thermostat acting upon a rise in temperature, above a predetermined maximum, to automatically open the relief valve and permit escape of the excess of the heated water. One of the disadvantages of these known types of relief valves has resided in the fact that the water in the hot water pipe between the heater and the storage tank frequently becomes excessively heated before the water in the storage tank has been heated to a dangerous or excessive degree. This results in unnecessary operation of the relief valve, and the draining of hot water from the storage tank before any real occasion therefor has arisen.

One of the principal objects of the present invention is to overcome this disadvantage of the old systems, and to this end the present invention proposes to incorporate the relief valve in the cold water supply pipe, adjacent to the storage tank. As a consequence of this organization of the relief valve in the cold water supply pipe, the valve will not be opened until excessively heated water has backed up into the cold water supply pipe. This insures a full supply of heated water in the storage tank before any of the water is drained off, and has been found to give an entirely satisfactory degree of protection against excessive heating or dangerous pressures without unnecessarily wasting the heated water.

Another important object of the invention resides in the provision of a novel form of thermostatically controlled valve, which is also responsive to excessive pressures, and which is of simple and durable construction, reliable and effective of operation, and easily and comparatively inexpensive to manufacture.

Other objects and changes reside in certain novel features of the construction, arrangement and combination of parts, which will be hereinafter more fully described, and particularly pointed out in the appending claims, reference being had to the accompanying drawings, forming a part of the specifications, and in which Figure 1 is a diagrammatic view in elevation, showing a hot water system having a safety relief valve organized therewith in accordance with the present invention;

Figure 2 is a detailed view partly in diametrical vertical section, and partly in elevation and illustrating the preferred form of safety relief valve, embodying the present invention;

Figure 3 is a similar view, showing another form of the relief valve;

Figure 4 is a fragmentary detailed view in elevation, showing the adjustable dial plate for regulating the temperature at which the thermostat functions to open the valve of Figure 3;

Figure 5 is a detailed perspective view of the lever employed between the thermostat and the valve of Figure 3;

Figure 6 is a similar view of the adjustable collar interposed between the dial plate and the lever.

Referring to the drawings, and more particularly to Figure 1, numeral 1 designates a storage tank for the hot water heating system, the tank being of any appropriate construction, and having the usual drain connection 2. A conventional heater 3 is provided, and may have an ordinary gas burner 4 for heating a coil 5 enclosed within the usual casing 6. Coil 5 has its lower end connected as at 7 to an intermediate portion of the storage tank, and has its upper end connected as at 8 to the upper portion of the storage tank.

A cold water supply pipe 10 is provided, and as shown has a section 10', extending through the top portion of the tank, and terminating within the tank, and adjacent to the lower end thereof. A waste pipe or off-take pipe 12 is provided.

The present invention proposes to interpose a safety relief valve designated generally at 13 in between the cold water supply pipe 10, adjacent to the point where this cold water supply pipe enters the tank 1 and the waste pipe 12.

While this safety relief valve 13 may vary in its construction, it is preferably of the type illustrated in Figure 2 and comprises a casing 20 connected as at 21, with a coupling 11 incorporated in the supply pipe 10. The casing 20 also has an internally threaded nipple 22 to which the waste pipe 12 connects. Intermediate the coupling 21 and nipple 22, the casing 20 is formed with an internal partition 23, into which a valve seat 24 is threaded. A valve 25 coacts with valve seat 24, and has a stem 26, passing therethrough, and threaded into a valve carrier 27. The valve carrier 27 has depending guiding ways 28, which slidably embrace the seat 24, to constrain the valve 25 to proper movement.

For biasing the valve 25 to closed position, a compression coil spring 29 is provided, one end of the spring 29 abutting the carrier 27, and the other end thereof engaging an adjustable abutment 30 threaded into the casing 20. The tension of the spring 29 may be regulated by adjusting the abutment 30 to vary the pressure at which the valve automatically opens. A cap 31 is threaded onto the casing 20 and encloses the abutment 30.

The present invention also proposes to automatically open the valve 25 in the event the water in the storage tank becomes excessively heated, and the excessively heated water backs up into the cold water supply pipe. For this purpose, a thermostat designated generally at 35 is provided, and has a bellows 36, the upper end of which is provided with a head 37. At the center of the head 37, a recess 37' is formed, to receive the rounded lower end of the valve stem 26. The bellows 36 also has a lower head 38, which is fixed in the hub of a spider 39, the arms of which are rigidly connected to the coupling 21. The lower head 38 of the bellows is coupled to the upper end of a series of connected and hermetically sealed tubes 40 of copper or other material having the property of rapidly conducting heat. The tubes 40 and the interior of the bellows 36 are filled with ether or other volatile substance, which expands and contracts appreciably in response to temperature changes. As shown in the drawings, the tubes 40 project down into the cold water supply pipe, and thus are influenced by the temperature of the water therein. Normally, the substance within the bellows and tubes 40 is sufficiently contracted to permit the valve 25 to remain seated under the influence of the spring 29 and against the pressure in the system. However, if the water in the storage tank becomes excessively heated, and the excessively heated water backs up into the cold water supply pipe 10, the heated water acts on the tubes 40, and heats up the volatile substance within the tubes 40 and bellows 36. As a consequence, the bellows 36 is expanded, and as its lower head is fixed, its upper head moves upwardly, thereby moving the valve stem 26 upwardly, and shifting the valve 25 away from its seat as shown in Figure 2. This permits the heated water to flow past the valve 25, and out through the waste pipe 12.

A modified form of safety relief valve is shown in Figures 3 to 6, and has a casing 45, provided with a nipple 46, which is coupled to the waste pipe 12, and also provided with a nipple 47, adapted to be connected by a pipe 48 with the coupling 11 of the cold water supply pipe shown in Figure 1. An internal ported partition 49 is provided within the casing 45 between the nipples 46 and 47. A valve 50 is normally held engaged with the valve seat provided around part of the partition 49 under the influence of its compression coil spring 51, tensioned by an adjustable abutment 52. The abutment 52 is enclosed in a cap 53.

With the arrangement as thus far described, the valve 50 will automatically open, if excessive pressures accumulate in the storage tank and back up into the cold water supply pipe.

In order that the valve 50 may also automatically open in the event that water in the storage tank becomes excessively heated, and the excessively heated water backs up into the cold water supply pipe, a thermostat designated generally at 55 is provided, and consists of a tube 56 of metal having a high coefficiency of expansion. One end of the tube is threaded into a spider 57 formed integrally with or otherwise suitably connected to the nipple 47, and the opposite end of the tube 56 has a plug 58 threaded thereunto, and connected to one end of a rod 59, consisting of metal having a relatively low coefficient of expansion. The end of the rod remote from the plug 58 has a dial plate 60, threaded thereon, so that as the dial plate is turned it moves to some extent back and forth along the rod 59. The dial plate abuts a collar 61, freely slidable along the rod 59 and having diametrically opposite pointed projections 62, engageable in correspondingly formed recesses 63, provided in an aperture end 64 of a lever 65, fulcrumed at 66 on the casing, and having a rounded end 67, engaging a boss on the valve 50. By turning the dial plate 60, the collar 61 is shifted along the rod 59, thereby adjusting the lever 65 on its fulcrum, and varying the temperature at which the thermostat will act through the lever to open the valve. Accurate adjustment of the dial plate 60 is facilitated by virtue of provision on the plate of scale markings 69, with which an arrow or pointer 70 on the casing coacts.

The invention claimed is:

1. A safety relief valve, including a casing adapted to be connected to a hot water heating system and to a waste pipe, a ported partition intermediate said connections, a spring biased valve cooperable with said ported partition, a thermostat, including a tube and having a high coefficient of expansion, and subject to the temperature of water in the heating system, a rod connected to the tube, a dial plate adjustable on the rod, a collar slidable along the rod, under the control of the dial plate, and having diametrically opposite pointed projections, and a lever fulcrumed in the casing, having one end bearing against the valve, and having its other end engaged by the pointed projections of the collar.

2. In a device of the character described, a casing adapted to be connected to a hot water heating system and to a waste pipe, a relief valve regulating communication of the casing with the waste pipe, means for biasing the relief valve to closed position and providing for automatic opening of the relief valve in the event that the pressure acting on the valve exceeds a predetermined amount, a lever fulcrumed in the casing and bearing at one end against the valve, a thermostat located on that side of the valve communicating with the hot water system and responsive to the temperature of the water in the system and an adjustable connection between the thermostat and the end of the lever remote from the valve, said adjustable connection including a dial plate functioning to indicate the temperature at which the thermostat will operate to rock the lever and automatically open the valve.

3. A device of the character described comprising a casing, a ported partition therein, a spring biased valve cooperable with said ported partition, a thermostat including a tube having a high co-efficient of expansion, a rod connected to the tube, a dial plate adjustable on the rod, a collar slidable along the rod and having diametrically opposite pointed projections and a lever fulcrumed in the casing having one end bearing against the valve and having its other end engaged by the pointed projections of the collar.

ROY W. JOHNSON.